United States Patent [19]

Cullen et al.

[11] Patent Number: 4,505,727
[45] Date of Patent: Mar. 19, 1985

[54] ADSORBENT CARTRIDGE

[75] Inventors: John S. Cullen, Buffalo; Samuel A. Incorvia; James A. Vogt, both of Tonawanda, all of N.Y.

[73] Assignee: Multiform Desiccants, Inc., Buffalo, N.Y.

[21] Appl. No.: 555,133

[22] Filed: Nov. 25, 1983

[51] Int. Cl.³ .............................................. B01D 53/04
[52] U.S. Cl. ........................................ 55/387; 55/512; 210/282; 210/483
[58] Field of Search ................. 55/384, 387, 512–515; 210/282, 455, 483, 484

[56] References Cited

U.S. PATENT DOCUMENTS

| 1,534,339 | 4/1925 | Perry ...................................... 55/384 |
| 1,621,283 | 3/1927 | Shover ............................... 55/384 X |
| 2,531,084 | 11/1950 | Sommer .................................. 312/31.1 |
| 2,577,606 | 12/1951 | Conley ............................... 55/512 X |
| 2,676,078 | 4/1954 | Young ................................. 55/384 X |
| 3,681,898 | 8/1972 | Hopkins et al. ................... 55/514 X |
| 3,785,497 | 1/1974 | Giffard ................................ 210/282 |
| 3,854,912 | 12/1974 | Terrel et al. ........................ 55/387 X |
| 4,072,615 | 2/1978 | McConnell ........................ 55/387 X |
| 4,266,539 | 5/1981 | Parker et al. ...................... 55/387 X |
| 4,394,144 | 7/1983 | Aoki et al. ......................... 55/512 X |
| 4,401,447 | 8/1983 | Huber ................................ 55/515 X |

FOREIGN PATENT DOCUMENTS 1596312  8/1981  United Kingdom ................. 55/384

Primary Examiner—Robert Spitzer
Attorney, Agent, or Firm—Joseph P. Gastel

[57] ABSTRACT

An adsorbent cartridge for mounting on a surface which may be oriented in a downwardly facing attitude, the absorbent cartridge including the substantially rigid self-sustaining first side facing the surface and a second permeable side of flexible sheet material secured to the first side and facing away from the surface, absorbent in the cartridge, a frustoconical central portion formed integrally with the first side and located centrally therein, and a bearing surface secured to the frustoconical portion for receiving the head of a screw which extends through an aperture within the bearing surface and is received in a mounting post on the surface.

12 Claims, 7 Drawing Figures

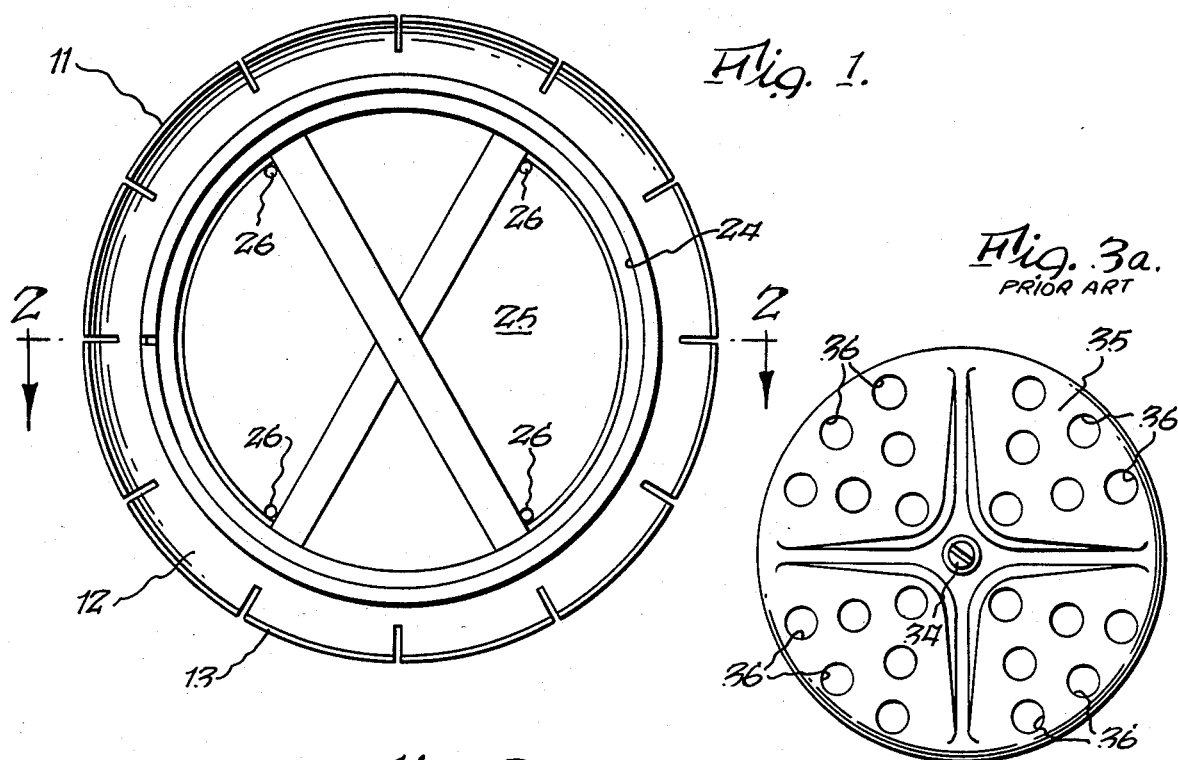
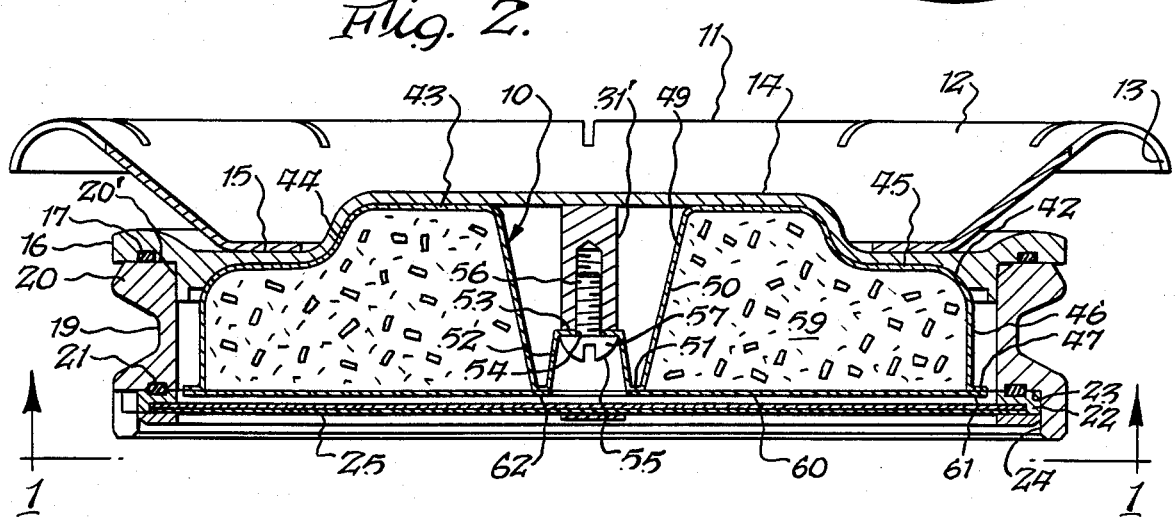
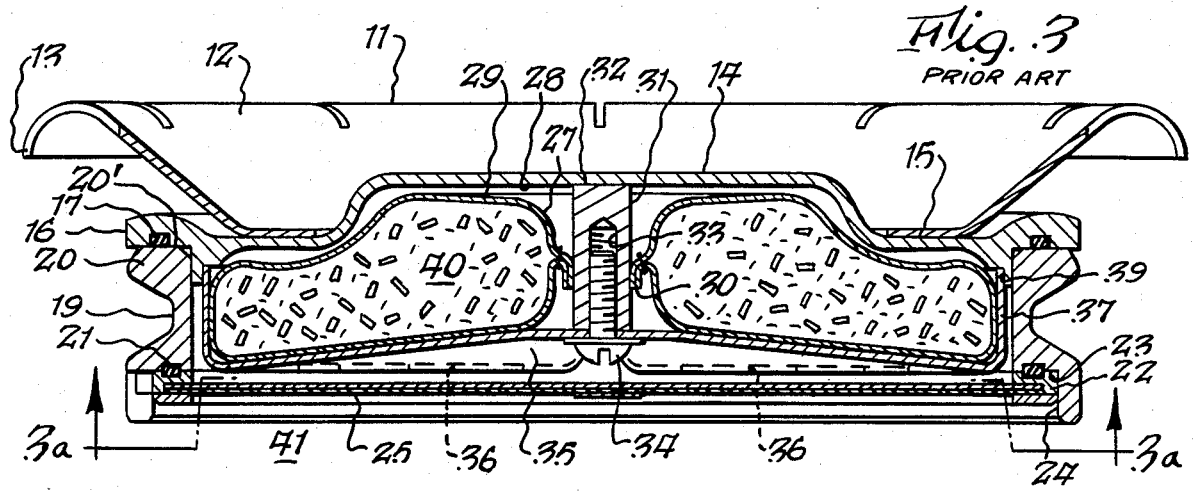

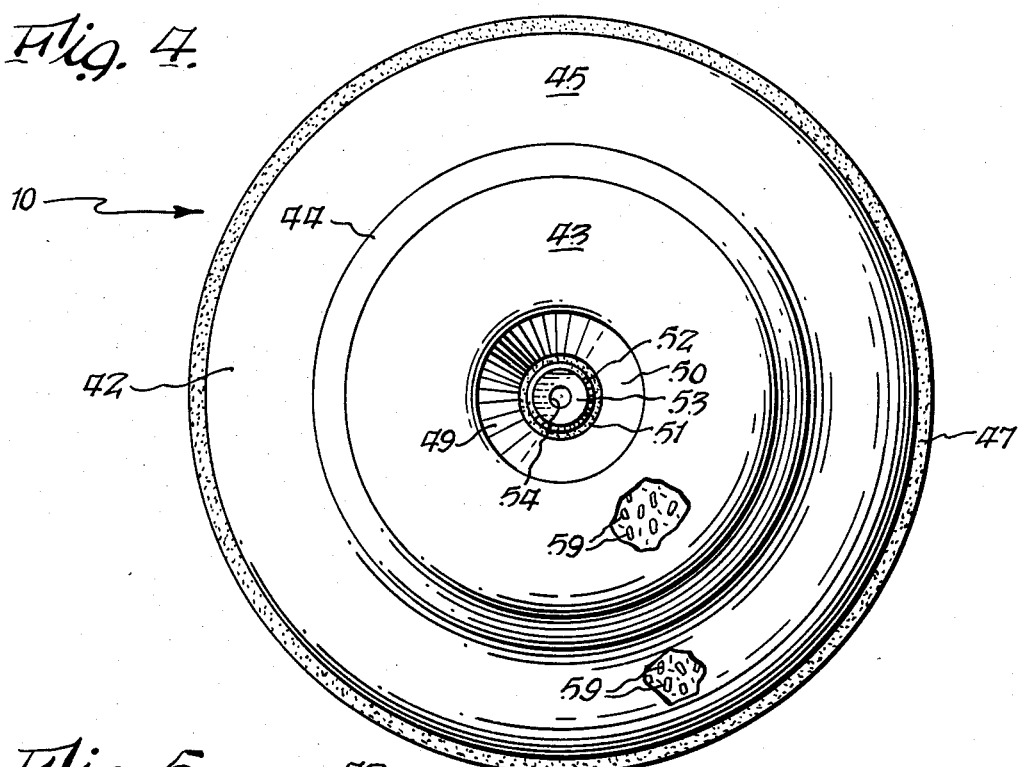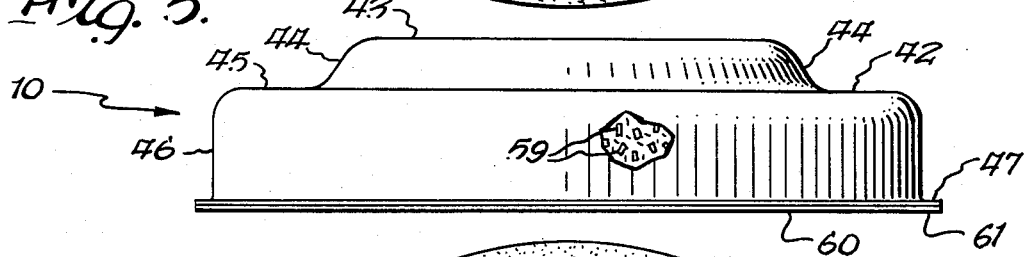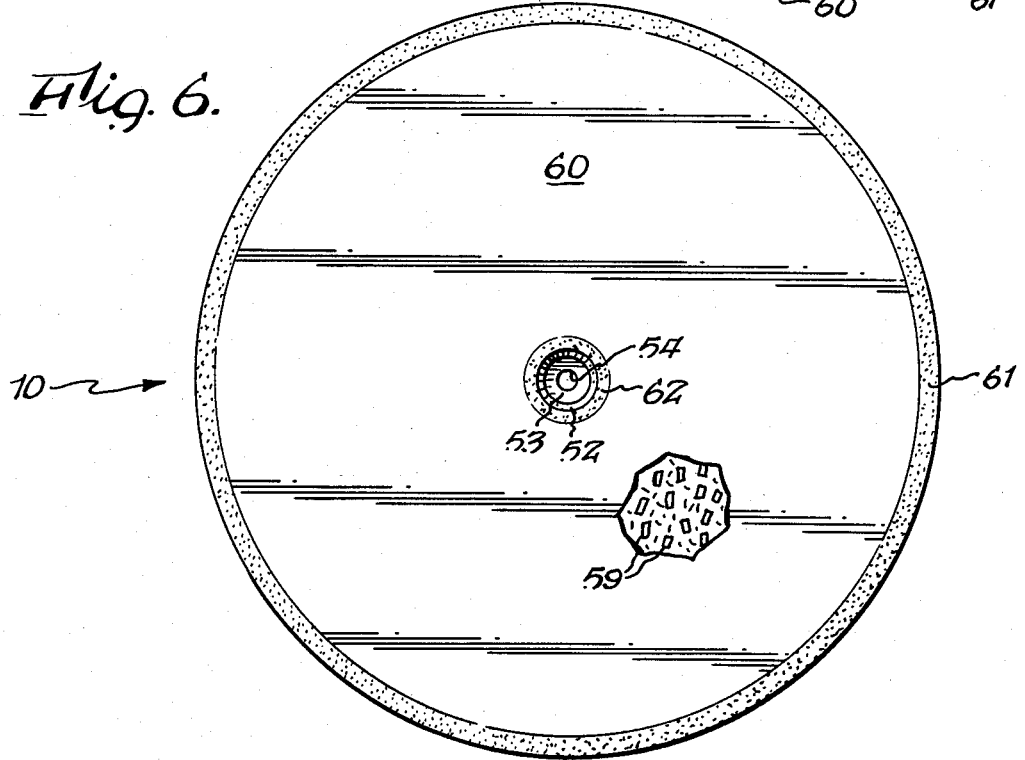

ADSORBENT CARTRIDGE

BACKGROUND OF THE INVENTION

The present invention relates to an improved self-sustaining adsorbent cartridge for mounting on a surface which is to be oriented in a downwardly facing attitude.

By way of background, in the past adsorbent cartridges have been mounted on covers of containers and on other surfaces which were oriented in a downwardly facing attitude. The cartridges have either been held in position by a complex mounting arrangement which required many parts or which often obstructed the cartridge, thereby lessening its adsorbing capability. It is with overcoming the foregoing deficiency of prior devices that the present invention is concerned.

SUMMARY OF THE INVENTION

It is one object of the present invention to provide an improved self-sustaining adsorbent cartridge which can be suspended in an extremely simple and expedient manner from a surface which is oriented in a downwardly facing attitude and which will have its entire face exposed to the environment which is to be subjected to adsorption.

Another object of the present invention is to provide an improved adsorbent cartridge which can be shaped to fit in complementary mating relationship with a compoundly curved surface, thereby permitting the cartridge to contain a maximum amount of adsorbent.

A further object of the present invention is to provide an improved adsorbent cartridge which can be mounted in an extremely simple and expedient manner by the use of extremely simple mounting devices. Other objects and attendant advantages of the present invention will readily be perceived hereafter.

The present invention relates to an adsorbent cartridge which is to be mounted on a surface which may be oriented in a downwardly facing attitude comprising a casing including a substantially rigid self-sustaining first side and a second permeable side of flexible sheet material secured relative to said first side, adsorbent in said casing confined between said first and second sides, and mounting means formed integrally with said first side for mounting said casing with said first side in contiguous relationship to said surface and with said second side facing away from said surface and exposed to the environment proximate said surface, said self-sustaining substantially rigid first side maintaining said casing in its fabricated contour and said second permeable side of flexible sheet material permitting gases to pass therethrough.

The various apsects of the present invention will be more fully understood when the following portions of the specification are read in conjunction with the accompanying drawings wherein:

BRIEF DESCRIPTION OF THE DRAWINGS

FIG. 1 is a view taken substantially along line 1—1 of FIG. 2 and showing a dust cover in position on the cap which mounts the improved adsorbent cartridge of the present invention;

FIG. 2 is a cross sectional view, taken substantially along line 2—2 of FIG. 1, of the improved adsorbent cartridge of the present invention mounted on the cap of a container;

FIG. 3 is a cross sectional view similar to FIG. 2 but showing the prior art construction which the adsorbent cartridge of the present invention replaces;

FIG. 3a is a view taken in the direction of line 3a—3a of FIG. 3 and showing the configuration of the face of a prior art bracket used to retain an adsorbent cartridge in position;

FIG. 4 is a top plan view, partially broken away, of the improved adsorbent cartridge of the present invention;

FIG. 5 is a side elevational view, partially broken away, of the improved adsorbent cartridge of the present invention; and FIG. 6 is a bottom plan view of the improved adsorbent cartridge of the present invention.

DESCRIPTION OF THE PREFERRED EMBODIMENTS

The improved adsorbent cartridge 10 of the present invention is intended for mounting on a surface which may be oriented in a downwardly facing attitude, or in fact any attitude other than an upwardly facing attitude. While the adsorbent cartridge 10 will be described relative to the cap of a missile casing, it will be understood that it is not limited thereto.

For a better understanding of the present invention, reference will first be made to the prior art construction of FIG. 3 wherein missile casing cap 11 is shown which includes an outer annular peripheral portion 12 having an annular flange 13 welded to central disc-like portion 14 along circumferential area 15 by a plurality of spot-welds, disc-like portion 14 terminating at outer annular edge 16 which carries an O-ring 17 in a groove therein. An annular rim 19 has a surface 20' which seals with O-ring 17 and a clamp (not shown) selectively secures annular portion 16 to annular portion 20 of rim 19. Rim 19 also carries an O-ring 21 in a groove therein, and the annular ring 22 fits against shoulder 23 of rim 19 to provide sealing with O-ring 21. Ring 22 is confined by cylindrical surface 24 of rim 19. A dust cover fabric 25 is held within ring 22 and it includes a plurality of apertures 26 which permit gases to pass through fabric 25. Annular member 19 is suitably secured to the remainder of the missile casing. The cap 11 can be removed from annular member 19 after the clamp (not shown) which connects outer portions 16 and 20 is removed.

In the past an adsorbent cartridge 27 was mounted within cap 11 in the following manner. The adsorbent cartridge 27 consisted of a flexible fabric casing 29 which was circular in plan and had a hole 30 centrally located therein. A post 31 had its end 32 welded to disc 15, and it was tapped at 33 to receive screw 34 which bore on circular metal retaining disc 35 having perforations 36 therein and a cylindrical flange 37 which was received within cylindrical flange 39 of cap 15. Suitable adsorbent 40 was contained in cartridge 27. The purpose of retaining disc 35 was to retain cartridge 27 in position when the cap 11 was oriented in the position shown in FIG. 3 with surface 28 facing downwardly, and when it was oriented in a position 90° from FIG. 3. The adsorbent cartridge 27 performed its function by communicating with the internal portion of a casing (not shown) at numeral 41 which was covered by cap 11 through apertures 26 in dust cover 25 and through apertures 36 in retaining disc 35. Since the walls 29 of cartridge 27 were fabricated from flexible cloth-like material, the cartridge did not completely fill the space between retaining disc 35 and disc 14. This being the case, the amount of adsorbent 40 which could be contained in casing 29 was less than the amount which could occupy the space between discs 14 and 35.

The improved adsorbent cartridge 10 of the present invention includes a vacuum formed polyethylene top 42 which includes an uppermost substantially planar annular portion 43 which merges into an annular sloping portion 44 which merges into annular planar portion 45 which merges into cylindrical portion 46 which merges into horizontal annular flange 47. In essence, member 42 is an inverted dish-shaped member. A central frustoconical shell-like member 49 is formed integrally with annular planar portion 43 and includes a side wall 50 which terminates at annular flange 51 formed integrally therewith. A second frustoconical member 52 is formed integrally with flange 51, and formed integrally with member 52 is an annular flange 53 having an aperture 54 which receives the shank 56 of screw 55 having a head 57 which bears against annular flange 53, which is a bearing surface, and locks it between post 31' and the head 57 of the screw. The frustoconical members 50 and 52 are rigid and provide good supporting structure for carrying the weight of the cartridge 10.

Cartridge 42 contains a suitable adsorbent 59 which is confined within member 42 by circular permeable planar side wall portion 60 which has its outer annular edge 61 fused to flange 47 by heat, electrostitching, or any other suitable form of attachment. The central portion of side 60 is fused at 62 to flange 51 of member 42 (FIG. 2). Side 60 is preferably fabricated from a material known under the trademark TYVEC which is a plastic which will pass gases and moisture vapor, but will not pass water.

It can readily be seen that since side 42 of the adsorbent cartridge 10 is self-sustaining, the necessity for retaining disc 35 of the prior art has been obviated. Furthermore, by the use of a planar side 60, rather than the complexly formed retaining grid 35, a greater volume of adsorbent 59 can be used in the same space below disc 14. Furthermore, since retaining disc 35, on which cartridge 27 of the prior art rested, has been eliminated, the entire side 60 is exposed whereas in the prior art device of FIG. 3, the portions of the cartridge which rested against the non-perforated portions of grid 35 were not exposed, but were blocked.

The improved adsorbent cartridge 10 can be attached to a surface which is oriented in a donwardly facing attitude without sagging because of the self-sustaining substantially rigid side 42, and the opposite side 60, which is fabricated of flexible material, will be exposed in its entirety to an environment from which gases are to be adsorbed because a retaining disc does not block it. Furthermore, as can be seen from a comparison of FIGS. 2 and 3, the substantially rigid side 42 is formed for complementary mating relationship with the surface of disc 14, thereby permitting a relatively large amount of adsorbent to be contained within cartridge 10, as compared to the amount of adsorbent which can be contained in the prior art fabric-sided cartridge 27 of FIG. 3 which does not fill a space completely, as shown.

The adsorbent 59 in adsorbent cartridge 10 may selectively include without limitation adsorbents such as silica gel, metal alumino silicate, alumina, calcium sulfate, activated charcoal, molecular sieve, or any other desired compound in bead, pellet or granular form.

It can thus be seen that the improved adsorbent cartridge of the present invention is manifestly capable of achieving the above-enumerated objects, and while a preferred embodiment has been disclosed, it will be appreciated that the present invention is not limited thereto, but may be otherwise embodied within the scope of the following claims:

What is claimed is:

1. In a device having a surface which may be oriented in a downwardly facing attitude, an adsorbent cartridge comprising a casing including a substantially rigid self-sustaining dish-shaped first side having a central portion and an outer portion lying outwardly of said central portion, a second side of permeable sheet material secured relative to said outer portion of said dish-shaped first side, adsorbent in said casing confined between said first and second sides, and mounting means on said central portion of said first side for mounting said casing with said first side in contiguous relationship to said surface and with said second side facing away from said surface and exposed to the environment proximate said surface, said mounting means comprising an elongated shell-like member extending toward said second side from said central portion, said shell-like member having first and second ends, said first end being secured to said central portion of said dish-shaped first side, and a bearing surface on said second end, said self-sustaining substantially rigid first side maintaining said casing in its fabricated contour and said second side of permeable sheet material permitting gases to pass therethrough into said cartridge.

2. In a device as set forth in claim 1 wherein said mounting means comprises a preformed portion of said dish-shaped first side.

3. In a device as set forth in claim 1 wherein said second side is substantially planar.

4. In a device as set forth in claim 1 including an aperture in said bearing surface for receiving a screw for attachment to said surface.

5. In a device as set forth in claim 4 wherein said first end of said elongated shell-like member is formed integrally with said central portion of said dish-shaped member.

6. In a device as set forth in claim 5 wherein said second end of said elongated shell-like member is formed integrally with said bearing surface.

7. In a device as set forth in claim 6 wherein said bearing surface is recessed within said elongated shell-like member.

8. In a device as set forth in claim 6 wherein said elongated shell-like member is frustoconical and has a smaller end and a larger end, and wherein said larger end is located proximate said first side, and wherein said smaller end is located proximate said second side.

9. In a device as set forth in claim 8 wherein said smaller end is secured to said second side.

10. In a device as set forth in claim 9 wherein said first side includes an outer rim, and wherein said second side is secured to said outer rim.

11. In a device as set forth in claim 1 wherein said dish-shaped member includes an outer substantially cylindrical side wall, and wherein said elongated shell-like member extends inwardly into the space defined by said substantially cylindrical side wall, said elongated shell-like member tapering toward said second side and being substantially frustoconical in configuration, said elongated shell-like member terminating at a first flange, a second flange on said cylindrical said wall, said second side being secured to said first and second flanges, a second shell-like member attached to said first flange and extending inwardly into said shell-like member, and a bearing surface on said second shell-like member.

12. In a device as set forth in claim 1 wherein said dish-shaped first side is of a shape for complementary mating engagement with said surface.

* * * * *

UNITED STATES PATENT AND TRADEMARK OFFICE
CERTIFICATE OF CORRECTION

PATENT NO. : 4,505,727
DATED : March 19, 1985
INVENTOR(S) : John S. Cullen et al It is certified that error appears in the above-identified patent and that said Letters Patent are hereby corrected as shown below:

In the Abstract, line 6, change "absorbent" to --adsorbent--.

Column 3, line 45, change "donwardly" to --downwardly--.

Column 4, line 59 (claim 11), change "cylindrical said wall" to --cylindrical side wall--.

Signed and Sealed this

Thirtieth Day of July 1985

[SEAL]

Attest:

DONALD J. QUIGG

Attesting Officer     Acting Commissioner of Patents and Trademarks